Figure 1:
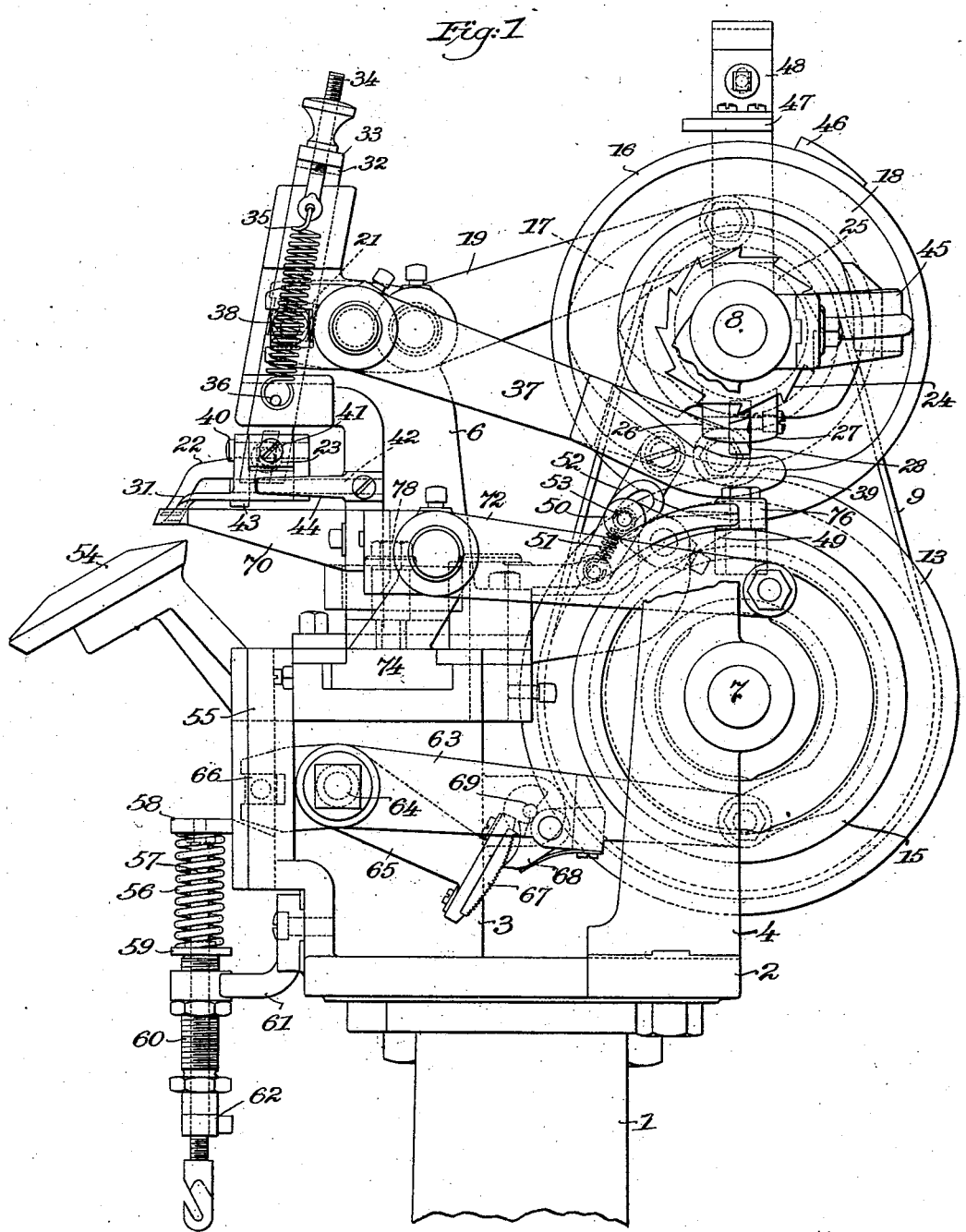

No. 703,574. Patented July 1, 1902.
J. B. HADAWAY.
STITCH SEPARATING MACHINE.
(Application filed Sept. 30, 1901. Renewed May 24, 1902.)

(No Model.) 5 Sheets—Sheet 1.

Witnesses:
John R. C. Prindlech
Fred O. Fish

Inventor:
John B. Hadaway
by his attorney
Benjamin Philipp

No. 703,574. Patented July 1, 1902.
J. B. HADAWAY.
STITCH SEPARATING MACHINE.
(Application filed Sept. 30, 1901. Renewed May 24, 1902.)

(No Model.) 5 Sheets—Sheet 3.

Witnesses:
John F.C. Prentiss
Fred O. Fish

Inventor:
John B. Hadaway
by his Attorney
Benjamin Phillips

No. 703,574. Patented July 1, 1902.
J. B. HADAWAY.
STITCH SEPARATING MACHINE.
(Application filed Sept. 30, 1901. Renewed May 24, 1902.)
(No Model.) 5 Sheets—Sheet 4.
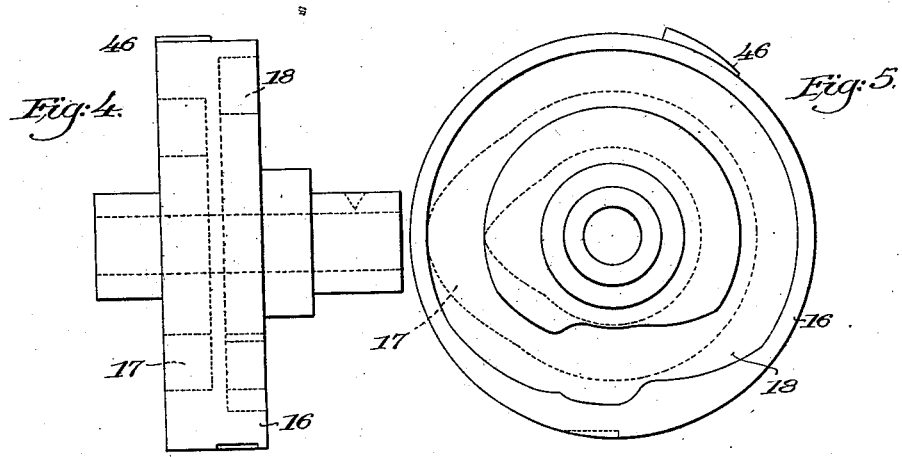
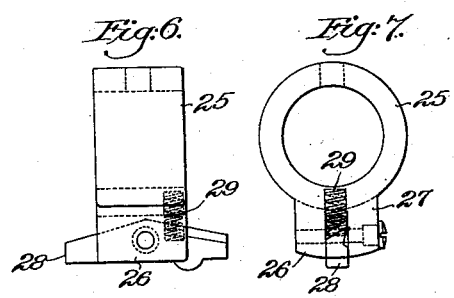
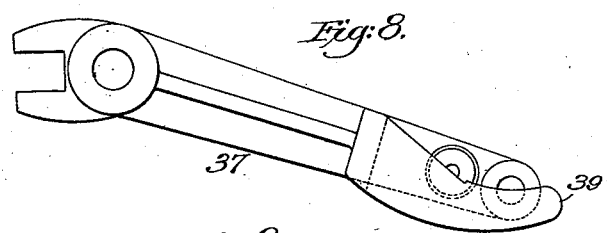
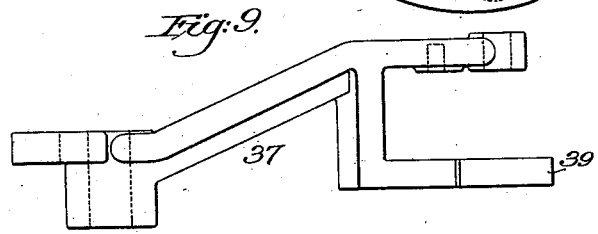
Witnesses:
John F. C. Brinckerhoff
Fred O. Fish
Inventor:
John B. Hadaway
by his Attorney
Benjamin Phillips
THE NORRIS PETERS CO., PHOTO-LITHO., WASHINGTON, D. C.

No. 703,574. Patented July 1, 1902.
J. B. HADAWAY.
STITCH SEPARATING MACHINE.
(Application filed Sept. 30, 1901. Renewed May 24, 1902.)
(No Model.) 5 Sheets—Sheet 5.
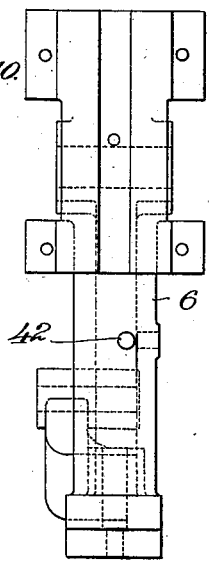
Fig. 10.
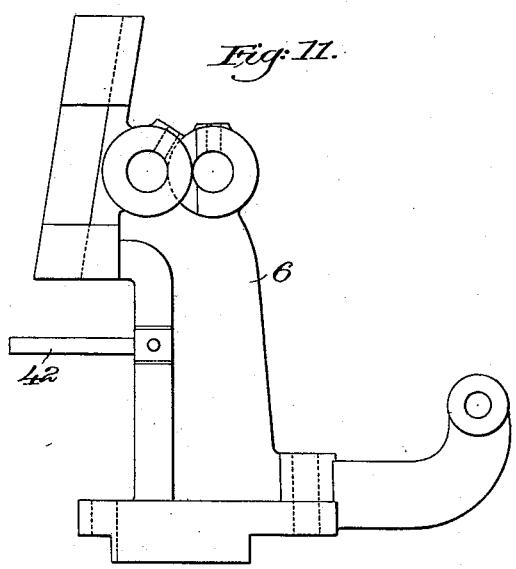
Fig. 11.
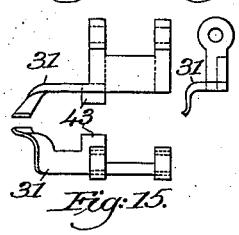
Fig. 13. Fig. 14.
Fig. 15.
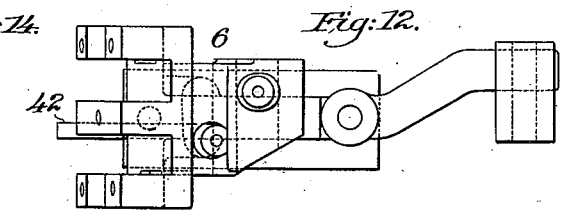
Fig. 12.
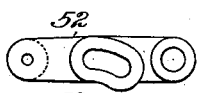
Fig. 16.
Fig. 18.
Fig. 17.
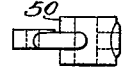
Fig. 19.
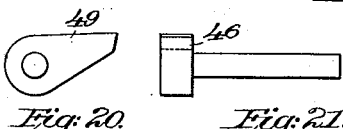
Fig. 20. Fig. 21.
Witnesses:
John F. C. Brinckerhoff
Fred O. Fish
Inventor:
John B. Hadaway
by his attorney
Benjamin Phillips
THE NORRIS PETERS CO., PHOTO-LITHO., WASHINGTON, D. C.

UNITED STATES PATENT OFFICE.

JOHN B. HADAWAY, OF BROCKTON, MASSACHUSETTS.

STITCH-SEPARATING MACHINE.

SPECIFICATION forming part of Letters Patent No. 703,574, dated July 1, 1902.

Application filed September 30, 1901. Renewed May 24, 1902. Serial No. 108,798. (No model.)

*To all whom it may concern:*

Be it known that I, JOHN B. HADAWAY, a citizen of the United States, residing at Brockton, in the county of Plymouth and State of Massachusetts, have invented certain new and useful Improvements in Stitch-Separating Machines; and I do hereby declare the following to be a full, clear, and exact description of the invention, such as will enable others skilled in the art to which it appertains to make and use the same.

The present invention relates to stitch-separating machines which are used in the manufacture of boots and shoes to indent the intervals between the stitches appearing at the outer edge of the sole, and more particularly to stitch-separating machines which are adapted to act on the boot or shoe after the seam has been finished.

A practically operative stitch-separating machine must be provided with means for compensating for the variations which occur in the length of the individual stitches of a seam in order to cause the indenting-tool to act on the work at the proper points with relation to the stitches and must also be capable of acting upon seams having stitches of different average length.

In an application filed of even date herewith, Serial No. 77,135, I have disclosed a stitch-separating machine which is designed to do the work of prior machines in as satisfactory or in a superior manner, and which at the same time is capable of compensating for greater variations in the length of the individual stitches of a seam, and which is capable of operating upon seams having a greater difference in the average length of their stitches than can be compensated for in prior machines. The broad principle of the invention disclosed in said application, of which the machine illustrated and described therein is a specific embodiment, consists in utilizing the stitch intervals to control the actuation of the indenting-tool, whereby the indenting-tool is actuated only when the relative positions of the tool and a stitch interval are such as to cause the tool to properly indent the stitch interval. In said application I have claimed this invention broadly as consisting of a stitch-separating machine provided with an indenting-tool and means controlled by the stitch intervals for actuating the indenting-tool to indent the stitch intervals. In the specific embodiment of this broad invention disclosed in said application means are provided for locating the indenting-tool in a stitch interval before its actuating mechanism is thrown into operation, the movement of the indenting-tool into a stitch interval acting to throw said mechanism into operation.

The object of the present invention is to produce a machine embodying the broad invention disclosed and claimed in said application, in which the mechanism for actuating the indenting-tool is thrown into operation independently of any coöperating action between the indenting-tool and the stitch intervals whenever the relative positions of the indenting-tool and a stitch interval are such as to cause the tool to properly indent the stitch interval when actuated.

With this object in view my invention contemplates providing a tool or device, which may be conveniently termed a "finder," arranged to coöperate with the stitches and to throw the mechanism for actuating the indenting-tool into operation whenever it enters a stitch interval.

My invention consists, broadly, in a stitch-separating machine provided with an indenting-tool, a finder arranged to enter the stitch intervals, and means controlled by the finder for actuating the indenting-tool to indent the stitch intervals.

My invention also consists in certain devices and combinations of devices hereinafter described and claimed, the advantages of which will be obvious to those skilled in the art, it being understood that the various features of invention recited in the claims are not limited to any specific construction or arrangement of parts, except where such limitations are expressly stated.

In the drawings accompanying this application I have illustrated my invention as embodied in a stitch-separating machine which is somewhat similar in the construction and mode of operation of many of its parts to the machine disclosed in my concurrently-filed application above referred to. It is to be understood, however, that while the machine illustrated embodies my invention in its preferred form my invention is not limited to any particular construction nor to any specific form of stitch-separating machine.

Having thus indicated the nature and scope of my invention, I will now proceed to describe the specific embodiment thereof shown in the drawings, in which—

Figure 2:
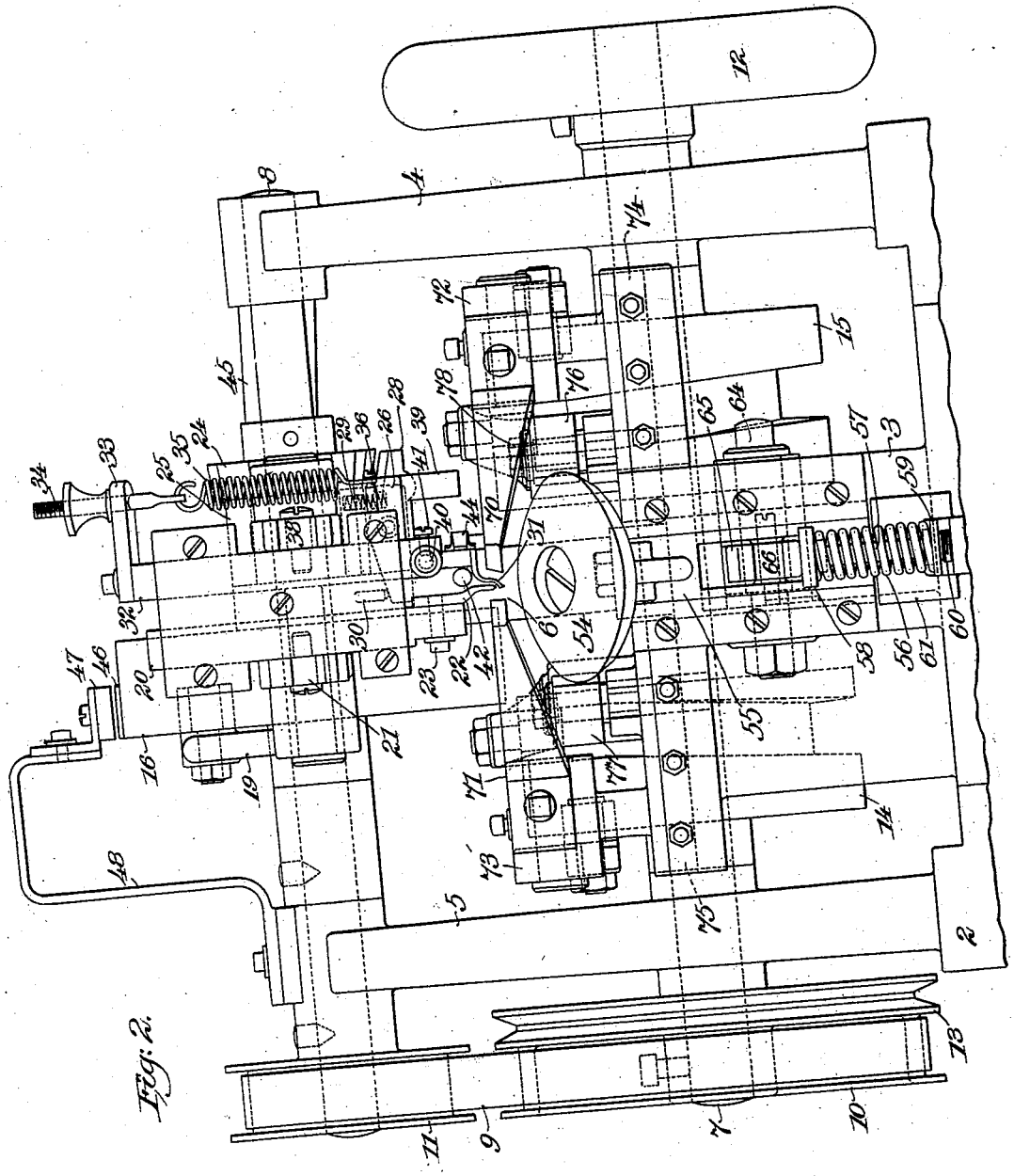
Figure 3:
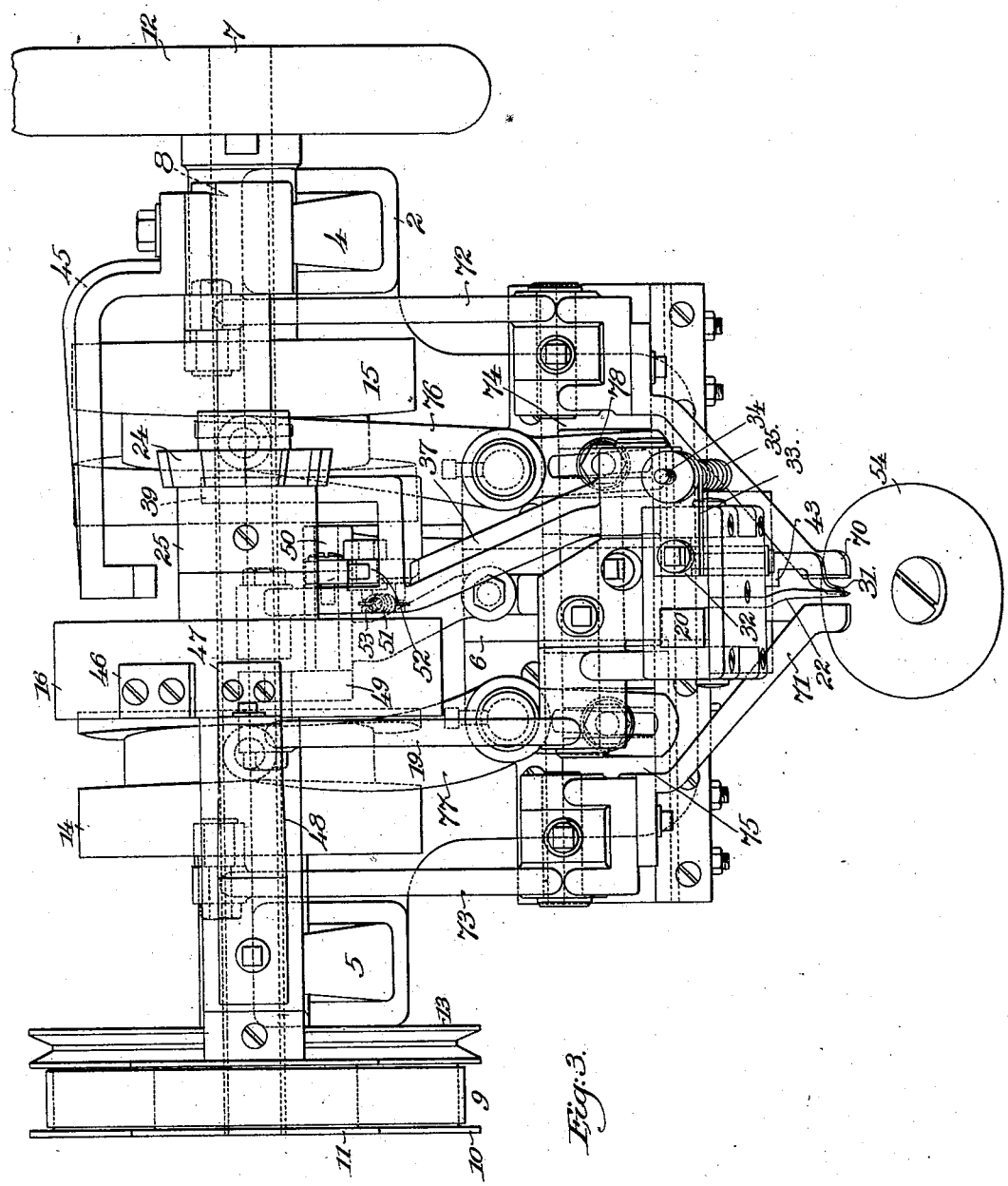

Figure 1 is an end elevation of a stitch-separating machine embodying my invention, the hand-wheel at the end of the main driving-shaft being removed and a portion of the frame being broken away to show underlying parts. Fig. 2 is a view in front elevation of the machine shown in Fig. 1. Fig. 3 is a plan view of the machine. Figs. 4 and 5 are views in side and end elevation of the cam forming a portion of the mechanism for actuating the indenting-tool. Figs. 6 and 7 are side and end views of a portion of the clutch for connecting the cam shown in Figs. 4 and 5 to its driving mechanism. Figs. 8 and 9 are side and plan views of the finder-actuating lever. Figs. 10, 11, and 12 are views in front elevation, side elevation, and plan of a bracket forming a portion of the machine-frame. Figs. 13, 14, and 15 are views in side elevation, end elevation, and plan of the tool or device which is termed in this specification a "finder." Figs. 16 and 17 are views in side elevation and plan of a connecting-link for operating the stop-pawl which holds the cam shown in Figs. 4 and 5 in position. Figs. 18 and 19 are views in side elevation and plan of an arm forming a portion of the stop-pawl, and Figs. 20 and 21 are views in end and side elevation of the stop-pawl.

Referring to the drawings, the frame of the machine is mounted upon a suitable pedestal 1 and consists of a base-plate 2, a front standard 3, rear standards 4 and 5, and a bracket 6, secured on top of standard 3 and projecting upwardly and then horizontally toward the front of the machine.

7 designates the main driving-shaft, journaled in suitable bearings in the standards 4 and 5, and 8 is a second shaft, mounted in bearings in the standards 4 and 5 above the shaft 6 and driven therefrom by means of a belt 9, passing over pulleys 10 and 11, secured to the shafts 7 and 8, respectively. Secured to one end of the shaft 7 is a hand-wheel 12 and to the other end a driving-belt pulley 13. Between the standards 4 and 5 cams 14 and 15 are secured to the shaft 7, and these cams are provided with cam-grooves, by which the mechanism for feeding the work and for locking and unlocking the work-support is actuated, as will be hereinafter described.

The cam 16 is loosely mounted upon the shaft 8 and is provided in its opposite faces with two cam-grooves 17 and 18, the first of which actuates the indenting-tool-actuating lever and the second of which actuates the finder-actuating lever. The cam 16 thus forms a portion of the mechanism for actuating the indenting-tool to indent the work, and the shaft 8 constitutes a driving mechanism for the cam normally disconnected therefrom. The remainder of the mechanism shown in the drawings for actuating the indenting-tool consists of an actuating-lever 19 and a rectangular rod 20. The lever 19 is pivotally mounted in the upper rear portion of the bracket 6 and is provided at its rear end with a roll which engages the cam-groove 17 of the cam 16. The front end of the lever 19 is slotted to engage a rectangular block 21, pivotally mounted upon a stud projecting laterally from the rod 20, which is mounted to reciprocate in a guideway in the front overhanging portion of the bracket 6. The indenting-tool 22 is adjustably secured to the lower end of the rod 20 by means of a bolt 23.

When the cam 17 is disconnected from its driving mechanism, it is held in the position shown in Fig. 1 by means to be hereinafter described, and the shape of the cam-groove 17 is such that when the cam is in this position the indenting-tool is raised from the work.

When the cam 17 is connected to its driving mechanism, the indenting-tool remains stationary during the first portion of the rotation of the cam in order to allow the finder to be moved out of the path of movement of the indenting-tool, as will be hereinafter described, and thereafter the indenting-tool is forced against the work to indent a stitch interval and then raised from the work to allow the finder to descend into a position beneath the indenting-tool.

The cam 16 is connected to the shaft 8 each time a stitch interval is brought into a position to be acted upon by the indenting-tool. For connecting the cam 16 to the shaft 8 a clutch is provided, which may be described as follows: A ratchet-wheel 24 is secured to the shaft 8, and a collar 25, provided with downwardly-projecting lugs 26 and 27, is secured to a sleeve projecting from the hub of cam 16. Between the lugs 26 and 27 is pivotally mounted a clutch-lever 28, the ends of which project beyond the lugs 26 and 27 on either side. A spring 29, seated in recesses in the collar 25 and lever 28, serves normally to hold one end of the lever out of the path of movement of the teeth of ratchet-wheel 24 and to press the other end of the lever against a stop-pin 30, (shown in dotted lines in Fig. 2,) which projects from the hub of the cam 16 and limits the movement of the lever 28 under the influence of the spring 29. The tension of spring 29 is such that when the lever 28 is moved into the path of the teeth of ratchet-wheel 24 it will be held in contact with the ratchet-wheel by friction, and the cam 16 will be rotated until the lever 28 is actuated to disengage the teeth of the ratchet-wheel.

For actuating the clutch-lever 28 to bring it into the path of the teeth of ratchet-wheel 24 each time a stitch interval is brought into position to be acted upon by the indenting-tool the following mechanism is provided: A tool 31, which for convenience I have designated a "finder," (shown separately in Figs.

13, 14, and 15,) is mounted upon the lower end of a rod 32, mounted in guideways in the bracket 6 beside the rod 20, to which the indenting-tool is secured. An arm 33 is secured to the upper end of the rod 32 and projects laterally therefrom. A screw-threaded rod 34 is adjustably secured to the arm 33 and is connected by means of a coiled spring 35 to a pin 36, projecting from the bracket 6. A lever 37 is pivotally mounted upon the upper rear portion of the bracket 6 and has its front end slotted to receive a rectangular block 38, pivotally mounted upon a stud projecting from the rod 32. The rear end of the lever 36 is provided with a roll, which engages the cam-groove 18 of the cam 16, and with an extension 39, which projects laterally and then in a direction parallel with the rear end of the lever. This extension 39 is located beneath the end of lever 28 which engages the teeth of ratchet-wheel 24 and acts to move the lever 28 into the path of the teeth of ratchet-wheel 24 when the rear end of lever 37 is raised. The cam-groove 18 is slightly enlarged, as shown in Figs. 1 and 5, to allow the rear end of the lever to be raised when the cam 16 is in the position shown in Fig. 1.

In the construction so far described it will be seen that the tendency of the spring 38 is to lower the rod 36 and the finder 31, mounted thereon. The work is held in position and fed past the finder and the indenting-tool, as will be hereinafter described, the finder being pressed against the work by the spring 38 and the downward movement of the finder and the rod 32 being limited by the contact of the finder with the work. So long as the finder 31 rests upon the crowns of the stitches it is held in its raised position, as indicated in Fig. 1. When, however, a stitch interval comes beneath the finder, the finder is caused to descend into the stitch interval by the action of spring 38, and this movement being communicated to the lever 37 through the rod 32 is sufficient to raise the rear end of the lever to cause the extension 39 to raise the lever 28 into the path of movement of the ratchet-wheel 24. The cam 16 is thus connected to its driving-shaft whenever a stitch interval is brought into a position beneath the finder, and the indenting-tool is actuated to indent the stitch interval.

The shape of the cam-groove 18 and the upper surface of the extension 39 is such that when the rear end of lever 37 is raised and the lever 28 is brought into the path of the teeth of ratchet-wheel 24 the lever 28 is forced firmly into engagement with one of the teeth of the ratchet-wheel during the first portion of the revolution of cam 16. During the revolution of cam 16 the lever 37 is actuated to raise the finder 31 from the work, and the lever 19 is actuated to cause the indenting-tool to indent the work, the cam-grooves 17 and 18 being so arranged with relation to each other that the finder 31 is raised before the indenting-tool descends.

When the cam 16 is disconnected from its driving mechanism and the parts are in the position shown in Figs. 1 and 2, the finder 31 is located directly below and in the path of movement of the indenting-tool, and in order to remove the finder from the path of the indenting-tool during its upward movement the following construction is provided:

The finder is pivotally mounted upon a horizontal pivot-pin 40, held in the lower end of the rod 32 by a screw 41, the construction being such that the finder is free to oscillate about the pivot-pin 40. A rod 42 projects horizontally from the lower front portion of the bracket 6 and is arranged to contact with a projection 43 of the finder (see more particularly Figs. 13 and 15) during the upward movement of the rod 32 and to swing the finder to one side. A spring 44, projecting from the bracket 6, presses against the finder 31 below the pivot-pin 40 and serves to return the finder to the position shown in Fig. 2 during the downward movement of rod 32. The finder 31 is held raised from the work for a sufficient length of time to enable the feeding mechanism to feed the work a sufficient distance to cause the finder to strike to one side of the stitch interval which has been indented, when it again descends upon the work.

After the clutch-lever 28 has been moved into the path of the teeth of ratchet-wheel 24 it remains in contact therewith until actuated in a direction to be disengaged therefrom. For actuating the lever 28 to disengage the teeth of ratchet-wheel 24, and thereby disconnect the cam 16 from its driving mechanism after a stitch interval has been indented, a stationary bracket 45 is provided, which is secured to the upper end of the standard 4 and extends into the path of movement of the end of lever 28 remote from the ratchet-wheel. To retard the motion of the cam and bring it to rest gradually after being disconnected from its driving mechanism, a braking-surface 46 is secured to or formed on the periphery of the cam and is arranged to contact with a braking-surface 47, carried upon a bent spring-arm 48, secured to the upper end of standard 5. The cam 16 is stopped and held in proper position at the end of its movement by means of a stop-pawl 49, pivotally mounted in a rearward extension of the bracket 6, which engages a notch cut in the periphery of the cam. This pawl is provided with an actuating-arm 50, (shown separately in Figs. 18 and 19,) which is secured to the pivot-pin of the pawl and is acted upon by coiled spring 51, which holds the pawl in contact with the periphery of the cam during its revolution and finally forces it into the notch.

Before the cam 16 is connected to its driving mechanism it is necessary that the stop-pawl 49 be moved out of the notch in the periphery of the cam, and in order to accomplish this result the rear end of the lever 37 is connected to the actuating-arm 50 of the pawl 49 by means of a link 52. The connection between the link 52 and the arm 50 consists of a pin 53, secured to the arm and projected through a slot in the link, this form of connection being for the purpose of allowing the link to move during the downward movement of the lever 37 without actuating the awl. The spring 51 is connected at one end to the pin 53 and at the other to the lower end of the link 52.

The operation of the mechanism so far described has been sufficiently indicated to be clearly understood and further description is considered unnecessary.

The support for the work, its actuating mechanism, and the mechanism for feeding the work past the finder and indenting-tool are the same as in the machine disclosed in my concurrently-filed application above referred to and may be described as follows: The support for the work is indicated at 54 and is rotatably mounted upon the upper end of a slide 55, mounted in a vertical guideway in the front of the standard 3. The slide 55 is yieldingly supported by means of a coiled spring 56, surrounding a rod 57 and interposed between a projection 58 on the slide, and a washer 59, resting upon the upper end of a screw-threaded sleeve 60. The sleeve 60 has an adjustable screw-threaded connection with a bracket 61, secured to the standard 3, and the rod 57 is secured to the projection 58 and extends downwardly through the sleeve 60. The upward movement of the slide 55 under the force of spring 56 is limited by a stop 62, secured to the lower end of the rod 57. The lower end of the rod 57 is connected by a cord or wire to a treadle, (not shown,) by means of which the slide 55 and work-support 54 carried thereby can be depressed to allow work to be inserted in and removed from the machine. For locking the work-support against downward movement during the action of the tool in indenting the work and during the feeding of the work a locking-lever 63 is provided, pivoted at 64 on the standard 3 and provided at its rear end with a roll engaging a groove in the face of the cam 15. Also pivoted at 64 is a lever 65, the front end of which is slotted to receive a block 66, pivotally mounted in an opening in the slide 55 and the rear end of which is provided with a series of ratchet-teeth 67. A spring-pressed pawl 68 is mounted upon the lever 63 and is arranged to engage the ratchet-teeth 67 when the lever 63 is lowered and raise the work-support slightly and lock it in raised position. A pin 69, projecting from a stationary part of the machine-frame, is arranged to contact with the pawl 68 and move it out of engagement with the ratchet-teeth 67 to unlock the work-support when the lever 63 is raised.

The feeding mechanism illustrated in the drawings comprises two feeding-jaws 70 and 71, located on opposite sides of the finder and indenting-tool. These jaws are secured to jaw-actuating levers 72 and 73, respectively, mounted so as to oscillate in vertical planes upon standards projecting upwardly from feeding-slides 74 and 75, mounted to reciprocate in horizontal guideways in the upper portion of the standard 3. For actuating the slides 74 and 75 feed-levers 76 and 77 are provided, pivoted upon the standard 3. The front end of the lever 76 is adjustably connected to the feed-slide 74 by means of a bolt 78, passing through slots in the lever and slide, and the front end of lever 77 is connected in a similar manner with the feed-slide 75. The rear ends of the levers are provided with rolls which engage cam-grooves formed in the peripheral surfaces of the cams 15 and 14. The construction of this feeding mechanism is such that four motions are imparted to the feeding-jaws 70 and 71, these motions being the same as those imparted to an ordinary four-motion feeding device. The feeding-jaws 70 and 71 act alternately to feed the work, so that a nearly continuous feed movement is imparted to the work, the work remaining stationary, however, for a short period while the work-support is unlocked to allow the work-support to accommodate itself to varying thickness of work.

The operation of the feeding mechanism and the mechanism for locking and unlocking the work-support may be briefly described as follows: Starting with the parts in the position shown in the drawings, in which position the work-support is locked against downward movement, feeding-jaw 70 is down upon the work and in its extreme position to the right as viewed in Figs. 2 and 3, and feeding-jaw 71 is down against the work and in its extreme position to the left. The work-support is first unlocked by the upward movement of lever 63 to allow the work-support to automatically adjust itself to the thickness of the work. After a brief interval the work-support is locked in position by the downward movement of the lever 63. The feeding-jaw 71 is then raised from the work and moved toward the right, and simultaneously the feeding-jaw 70 is moved toward the left, thereby feeding the work past the indenting-tool. The feeding-jaw 71 then descends upon the work, and the feeding-jaw 70 rises from the work. The feeding-jaw 71 is then moved to the left to again feed the work past the indenting-tool, and the feeding-jaw 70 is moved to the right and then into contact with the work, the cycle of operations being repeated so long as the driving-shaft 7 continues to rotate. By adjusting the extent of movement imparted to the feed-slides the distance the work is fed before the finder again comes in contact with the work after the indenting-tool has been actuated to indent a stitch interval can be varied and the finder caused to strike at such a distance from the indented stitch interval as will insure the mechanism for actuating the indenting-tool being held out of operation until the next stitch interval is brought beneath the finder.

Having thus indicated the nature and scope of my invention and having specifically described the preferred embodiment thereof, I claim as new and desire to secure by Letters Patent of the United States—

1. A stitch-separating machine, having, in combination, an indenting-tool, a finder arranged to enter the stitch intervals, and means controlled by the finder for actuating the indenting-tool to indent the stitch intervals, substantially as described.

2. A stitch-separating machine, having, in combination, an indenting-tool, mechanism for actuating the tool, a finder arranged to enter the stitch intervals, and connections between the finder and the mechanism for actuating the tool acting to throw said mechanism into operation when the finder enters a stitch interval, substantially as described.

3. A stitch-separating machine, having, in combination, an indenting-tool, a finder, means for holding the finder in contact with the work and causing it to enter the stitch intervals, and means thrown into operation by the movement of the finder into a stitch interval for actuating the indenting-tool to indent the stitch intervals, substantially as described.

4. A stitch-separating machine, having, in combination, an indenting-tool, a finder, means for holding the finder in contact with the work and causing it to enter the stitch intervals, means for feeding the work, and means thrown into operation by the movement of the finder into a stitch interval for actuating the indenting-tool to indent the stitch intervals, substantially as described.

5. A stitch-separating machine, having, in combination, an indenting-tool, a finder, a spring for holding the finder in contact with the work and causing it to enter the stitch intervals, and means thrown into operation by the spring when the finder enters a stitch interval for actuating the indenting-tool to indent the stitch intervals, substantially as described.

6. A stitch-separating machine, having, in combination, an indenting-tool, a finder arranged to enter the stitch intervals, and means controlled by the finder for withdrawing the finder from the stitch intervals and for actuating the indenting-tool to indent the stitch intervals, substantially as described.

7. A stitch-separating machine, having, in combination, an indenting-tool, a finder, means for holding the finder in contact with the work and causing it to enter the stitch intervals, and means thrown into operation by the movement of the finder into a stitch interval for withdrawing the finder from the stitch intervals and for actuating the indenting-tool to indent the stitch intervals, substantially as described.

8. A stitch-separating machine, having, in combination, an indenting-tool, a finder, means for holding the finder in contact with the work and causing it to enter the stitch intervals, means for feeding the work, and means thrown into operation by the movement of the finder into a stitch interval for withdrawing the finder from the stitch intervals and for actuating the indenting-tool to indent the stitch intervals, substantially as described.

9. A stitch-separating machine, having, in combination, an indenting-tool, a finder, cams for actuating the finder to withdraw from the stitch intervals and for actuating the indenting-tool to indent the stitch intervals, driving mechanism for the cams, a clutch for connecting the cams to their driving mechanism, means for holding the finder in contact with the work and for causing it to enter the stitch intervals, and connections between the finder and the clutch for actuating the clutch to connect the cams to their driving mechanism when the finder enters a stitch interval, substantially as described.

In testimony whereof I affix my signature in presence of two witnesses.

JOHN B. HADAWAY.

Witnesses:
FRED O. FISH,
ALFRED H. HILDRETH.